(12) United States Patent  (10) Patent No.: US 7,652,577 B1
Madhow et al.  (45) Date of Patent: Jan. 26, 2010

(54) SYSTEMS AND METHODS OF BEAMFORMING IN RADIO FREQUENCY IDENTIFICATION APPLICATIONS

(75) Inventors: Upamanyu Madhow, Santa Barbara, CA (US); Ben J. Wild, Oakland, CA (US); Kannan Ramchandran, El Cerrito, CA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 305 days.

(21) Appl. No.: 11/702,980

(22) Filed: Feb. 5, 2007

Related U.S. Application Data

(60) Provisional application No. 60/765,331, filed on Feb. 4, 2006.

(51) Int. Cl.
 *G08B 13/14* (2006.01)
(52) U.S. Cl. .................................. 340/572.1; 340/572.2
(58) Field of Classification Search .............. 340/572.1, 340/572.2, 572.4, 572.7, 539.1, 539.21; 455/562.1, 455/552.1, 73; 342/418, 432, 465
 See application file for complete search history.

(56) References Cited

U.S. PATENT DOCUMENTS

| | | | |
|---|---|---|---|
| 6,037,898 A | 3/2000 | Parish et al. | |
| 6,252,542 B1 | 6/2001 | Sikina et al. | |
| 7,030,761 B2 | 4/2006 | Bridgelall et al. | |
| 7,161,489 B2 * | 1/2007 | Sullivan et al. | 340/572.4 |
| 7,187,288 B2 * | 3/2007 | Mendolia et al. | 340/572.1 |
| 7,345,625 B1 | 3/2008 | Urkowitz | |
| 7,362,266 B2 | 4/2008 | Collinson | |
| 7,378,967 B2 * | 5/2008 | Sullivan et al. | 340/572.2 |
| 7,423,586 B2 | 9/2008 | Schieblich | |
| 2002/0042290 A1 | 4/2002 | Williams et al. | |
| 2003/0007473 A1 | 1/2003 | Strong et al. | |
| 2004/0061644 A1 | 4/2004 | Lier et al. | |
| 2005/0018861 A1 | 1/2005 | Tashev | |
| 2005/0141459 A1 | 6/2005 | Li et al. | |
| 2005/0237953 A1 | 10/2005 | Carrender et al. | |

(Continued)

FOREIGN PATENT DOCUMENTS

WO WO 2006/026518 A2 3/2006

(Continued)

OTHER PUBLICATIONS

Bernard Widrow and John M. McCool, "A Comparison of Adaptive Algorithms Based on the Methods of Steepest Descent and Random Search," IEEE Transactions on Antennas and Propagation, vol. 24, No. 5, pp. 615-637 (Sep. 1976).

(Continued)

*Primary Examiner*—John A Tweel, Jr.
(74) *Attorney, Agent, or Firm*—Caesar, Rivise, Bernstein, Cohen & Pokotilow, Ltd.

(57) ABSTRACT

Systems and methods for beamforming in radio frequency identification (RFID) applications are disclosed. A beamforming system uses a distributed architecture and techniques for antenna beamforming using a feedback control loop to direct radio frequency (RF) energy onto a specific region, referred to as an interrogation zone, which includes a calibration node where one or more RFID tags may be located. The distributed architecture of the beamforming system is resistant to fading and shadowing effects, providing accurate RFID reader operation even in environments with multi-path reflections or environmental changes, such as people moving around or changes in the location of equipment.

25 Claims, 10 Drawing Sheets

U.S. PATENT DOCUMENTS

| | | |
|---|---|---|
| 2006/0022800 A1* | 2/2006 | Krishna et al. ............ 340/572.1 |
| 2006/0033609 A1 | 2/2006 | Bridgelall |
| 2006/0044147 A1 | 3/2006 | Knox et al. |
| 2006/0135211 A1 | 6/2006 | Chae et al. |
| 2006/0291544 A1 | 12/2006 | Fischer et al. |
| 2007/0149251 A1 | 6/2007 | Jeon |
| 2008/0012710 A1* | 1/2008 | Sadr ........................ 340/572.1 |
| 2008/0030422 A1 | 2/2008 | Gevargiz et al. |
| 2008/0061984 A1 | 3/2008 | Breed et al. |
| 2008/0068265 A1* | 3/2008 | Kalliola et al. ............. 342/418 |
| 2008/0242240 A1* | 10/2008 | Rofougaran et al. .......... 455/73 |
| 2008/0318632 A1* | 12/2008 | Rofougaran et al. ..... 455/562.1 |

FOREIGN PATENT DOCUMENTS

WO    WO 2006/099148 A1    9/2006

OTHER PUBLICATIONS

R. Mudumbai, J. Hespanha, U. Madhow, and G. Barriac, "Scalable Feedback Control for Distributed Beamforming in Sensor Networks," Proc. 2005 IEEE International Symposium on Information Theory (ISIT 2005), Adelaide, Australia (Sep. 2005).

"Omron Develops World-First RFID Technology for Measuring the Distance Between UHF-Band Antenna and IC Tags," http://www.finanznachrichten.de/nachrichten-2007-09/artikel-8988010.asp. (Sep. 10, 2007).

* cited by examiner

SYSTEMS AND METHODS OF BEAMFORMING IN RADIO FREQUENCY IDENTIFICATION APPLICATIONS

CROSS-REFERENCE TO RELATED APPLICATIONS

This application claims the benefit of U.S. Provisional Application Ser. No. 60/765,331 titled "Methods and architectures for increasing range and reliability in RFID systems," filed Feb. 4, 2006, which is hereby incorporated by reference.

BACKGROUND OF THE INVENTION

1. Field of the Invention

The present invention relates generally to radio frequency identification (RFID) applications, and more particularly to systems and methods of beamforming in RFID applications.

2. Description of Related Art

Many radio frequency identification systems use battery-less tags that can be identified by a reader through radio frequency communication to label items. In these systems, an RFID reader (comprising a radio frequency transmitter and receiver) energizes the tag and then receives data from the tag. Conventional readers for passive RFID systems typically operate by the RFID reader first sending an unmodulated radio frequency (RF) signal to power the tag; then sending interrogation data to the tag; and then receiving modulated backscatter back from the tag. The maximum read range of an RFID reader is typically limited by the power needed to energize the tag and to generate the backscatter response. Additionally, the read range and reliability varies significantly depending upon the scattering environment. Thus, the location of the RFID reader's antenna(s) (and/or antenna elements) has to be carefully positioned and/or tuned by experts to optimize performance in settings such as, for example, a factory floor, a production facility, or a commercial establishment.

Antenna beamforming comprises using two or more antennas (or antenna elements) to direct electromagnetic energy to a certain region in space. Using beamforming, the direction of a beam of electromagnetic energy can be varied electronically by selecting the gains and phases of the signals fed to each of the two or more antennas. By using more antennas, the beam of electromagnetic energy can be made narrower, thus increasing the total energy directed to a certain region in space, such as a desired surface. Antenna beamforming is used in such systems as cellular phone base stations and wireless local area network (LAN) base stations.

Conventional RFID systems connect the antenna elements to the transmitter and receiver through coaxial cables designed for carrying high frequency electrical signals. The RFID reader may control the input phase into each of the antenna elements to achieve the desired beam directionality. However, there are a number of problems with the conventional approach. For example, coaxial cable is bulky and expensive. In addition, the users of these systems must manually configure and/or tune the RFID reader's antennas to direct the electromagnetic beam in a desired direction. This manual configuration and/or tuning is time consuming and requires technicians skilled in radio frequency technology. Moreover, the configuration and/or tuning may no longer function when there are changes in the radio frequency environment or when the RFID tags are in motion.

SUMMARY OF THE INVENTION

The present invention includes a beamforming system for enhancing read range and reliability in RFID applications, and facilitates deployment of RFID applications by non-experts. A distributed architecture uses techniques for antenna beamforming and a feedback control loop to direct radio frequency (RF) energy onto a specific region, referred to as an interrogation zone, which includes a calibration node where one or more RFID tags may be located.

The use of a beamforming system increases the signal strength in the interrogation zone for a given transmitted power, thus allowing for either increased range for a given amount of transmitted power, or for reduction in the transmitted power required to achieve a given signal strength in the interrogation zone. As a result, interference (e.g., inter-reader interference) can be reduced in applications where multiple RFID readers are deployed. The beamforming system also directs the transmitted signal and hence reduces the multipath interference due to signal reflection from scattering, thus reducing signal fading and increasing reliability.

A feedback control loop using a calibration node in the interrogation zone enables the beamforming system to automatically maximize the signal power and signal-to-noise ratio in the interrogation zone without manual configuration and/or tuning. The beamforming system, comprising beamforming nodes, calibration nodes, and a reader node, can self-calibrate to adjust for the environmental conditions and the relative positions of the nodes and the interrogation zone. Thus, the installation and maintenance of the beamforming system is simplified.

The beamforming system eliminates the need for connecting the beamforming nodes via coaxial cables, decreasing cost and increasing the flexibility of deployment. The flexibility in placement of the beamforming nodes also reduces fading and shadowing effects. For example, even if the path from one of the beamforming nodes to the RFID tags is blocked, the signal from the other beamforming nodes may provide enough received signal strength at the RFID tag for reliable operation and for communication with the reader.

Various embodiments of the invention include a system for radio frequency identification of a tagged item in an interrogation zone comprising a plurality of beamforming nodes, each configured to generate radio frequency identification signals in a first frequency band, a calibration node disposed in the interrogation zone configured to measure a signal strength of the radio frequency identification signals and to transmit a signal strength data in a second frequency band, and a reader node configured to receive the signal strength data in the second frequency band, adjust the radio frequency identification signals generated by the beamforming nodes, and receive a radio frequency identification data in the first frequency band from the tag.

Other embodiments of the invention include a method for beamforming comprising generating radio frequency identification signals, measuring a signal strength of the radio frequency identification signals in an interrogation zone, reading the signal strength, and adjusting the radio frequency identification signals based on the signal strength in a feedback control loop.

Still further embodiments of the invention include a method for beamforming comprising sending a command and power and/or phase data to a plurality of beamforming nodes, transmitting a radio frequency identification signal using the plurality of beamforming nodes, receiving the radio frequency identification signal using a calibration node, transmitting a signal strength data based on the radio frequency identification signal from the calibration node to the reader node, adjusting the command and the data based on the signal strength data, and sending the adjusted command and the adjusted data to the plurality of beamforming nodes.

BRIEF DESCRIPTION OF THE DRAWINGS

For a more complete understanding of the present invention, reference is made to the following description taken in conjunction with the accompanying drawings, in which.

DETAILED DESCRIPTION OF THE INVENTION

Figure 1:
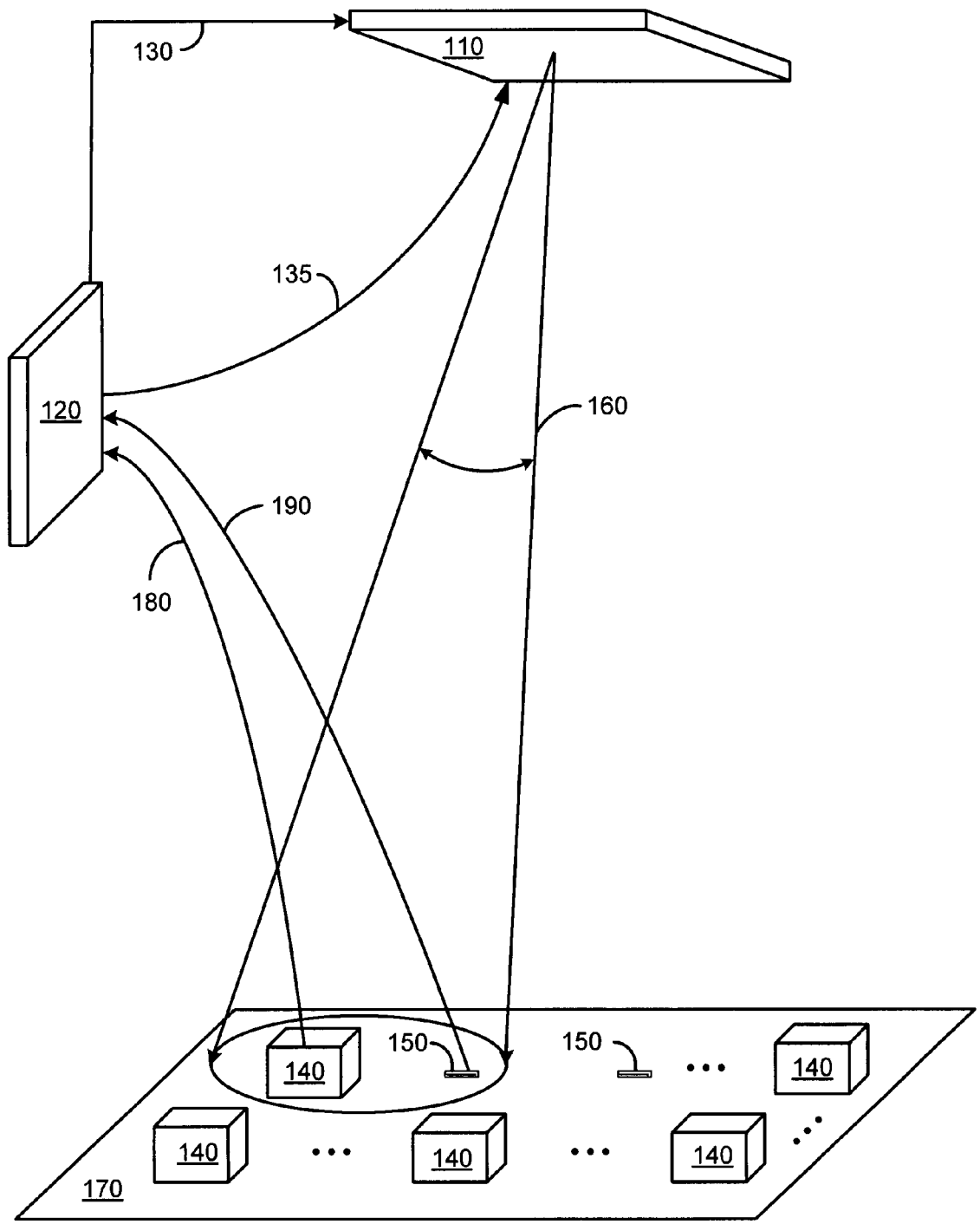
FIG. 1 illustrates a beamforming system for a radio frequency identification application, according to various embodiments of the present invention.

The present invention includes systems and methods for beamforming in radio frequency identification applications. A distributed architecture uses techniques for antenna beamforming and a feedback control loop to direct radio frequency (RF) energy onto a specific region including a calibration node, referred to as an interrogation zone, where one or more RFID tags may be located.

The distributed architecture of the beamforming system is resistant to fading and shadowing effects, providing accurate RFID reader operation even in environments with multi-path reflections or environmental changes, such as people moving around, changes in the location of equipment, etc. By connecting the beamforming nodes to the RFID reader node using a wireless coupling, the need for coaxial cable is eliminated. The distributed architecture also enables the use of low-cost, low-data rate wires for communication between the reader node and the beamforming nodes. Furthermore, the architecture of the beamforming system provides flexibility in the number and the placement of the beamforming nodes.

The beamforming system is self-calibrating, eliminating the need for manual configuration of the RFID reader and antennas when the system is initially set up. In addition, the self-calibration feature enables the beamforming system to function when the radio frequency identification tags are in motion. The self-calibration feature is enabled by the use of a feedback control loop, using feedback from a calibration node placed in the vicinity of the tags (i.e., in the interrogation zone). In various embodiments, the beamforming nodes use the closed-loop feedback from one or more of the calibration nodes to adapt the phase of the radio frequency identification signal transmitted by the beamforming nodes, so as to maximize the power or the signal-to-noise ratio received by the RFID tags in the interrogation zone.

The feedback control loop provides flexibility in the positioning of the beamforming nodes. Thus, positioning of the beamforming nodes can be done based on a combination of practical considerations, such as ease of deployment, and performance considerations, such as maximization of power or signal-to-noise ratio. The closed-loop feedback is provided using a calibration node in the interrogation zone.

The closed-loop feedback adaptation of the powers and/or phases of the radio frequency identification signal transmitted by the beamforming nodes can be achieved by various iterative algorithms, including algorithms that require only one bit of feedback per iteration, see, e.g., Bernard Widrow and John M. McCool, "A Comparison of Adaptive Algorithms Based on the Methods of Steepest Descent and Random Search," *IEEE Transactions on Antennas and Propagation*, vol. 24, no. 5, pp. 615-637 (September 1976), and R. Mudumbai, J. Hespanha, U. Madhow, G. Barriac, "Scalable Feedback Control for Distributed Beamforming in Sensor Networks," *Proc. 2005 IEEE International Symposium on Information Theory (ISIT 2005)*, Adelaide, Australia (September 2005).

In various embodiments, the beamforming system can use the 900 MHz UHF frequency band for radio frequency identification signals for a first frequency band (the RFID band) employed by the signals received and transmitted by the RFID tag, and another band, for example the 2.4 GHz band, as a second frequency band for control signals to couple between the calibration node, the reader node, and beamforming nodes. The separation in frequency between the RFID band and the control band simplifies the design of the analog components of the beamforming system. The beamforming system may use frequency bands other than those identified herein for the first frequency band and the second frequency band. Furthermore, the RFID band and the second frequency band for control signals may partially or fully overlap in frequency.

FIG. 1 is a beamforming system for a radio frequency identification application. The system comprises a beamforming module 110 having two or more beamforming nodes which generate a radio frequency identification signal 160, a reader module 120, one or more RFID tags 150, one or more calibration modules 140, and an interrogation zone 170 in which one or more calibration modules 140 and RFID tags 150 may be present. A control radio frequency connection 135 couples the reader module 120 and beamforming module 110. A calibration data radio frequency connection 180 couples the calibration module(s) 140 to the reader module 120, and a radio frequency identification data 190 couples the RFID tag 150 to the reader module 120.

In various embodiments, the reader module 120 may communicate with the beamforming module 110 via beamforming control radio frequency connection 135, via beamforming control hardwired connection 130, or via both. The calibration module 140 may also communicate with the reader module 120 through a hardwired connection (not shown) rather than a calibration data radio frequency connection 180, and directly with the beamforming module 110 through either a wireless or a hardwired connection (not shown), rather than indirectly using reader module 120. The calibration module 140 may receive the radio frequency identification data 190 transmitted by the RFID tags 150 and communicate this data to the reader module 120.

The calibration module 140 measures the net received signal from the beamforming module 110 via the radio frequency identification signal 160. The calibration module 140 communicates with the reader module 120 (or directly with the beamforming module 110 as above) to report the measurements of the received signal.

A feedback control loop comprising the calibration module 140, the reader module 120, and the beamforming module 110 is used to adjust the power and phase of the radio frequency identification signal 160 so as to increase the strength and/or signal-to-noise ratio of the radio frequency identification signal 160 received at the calibration module 140. The radio frequency identification signal 160 transmitted by the beamforming module 110 is in accordance with standard RFID reader-tag protocols, and the response from the RFID tags 150 is processed in a standard manner by the reader module 120. The reader module 120 can be co-located with the beamforming module 110. In various embodiments, the beamforming module 110 is separated from the calibration module 140 by one meter or more and/or the reader module 120 is separated from the calibration module 140 by one meter or more. In typical applications, these separation distances may vary from less than one meter to more than one meter.

Figure 2:
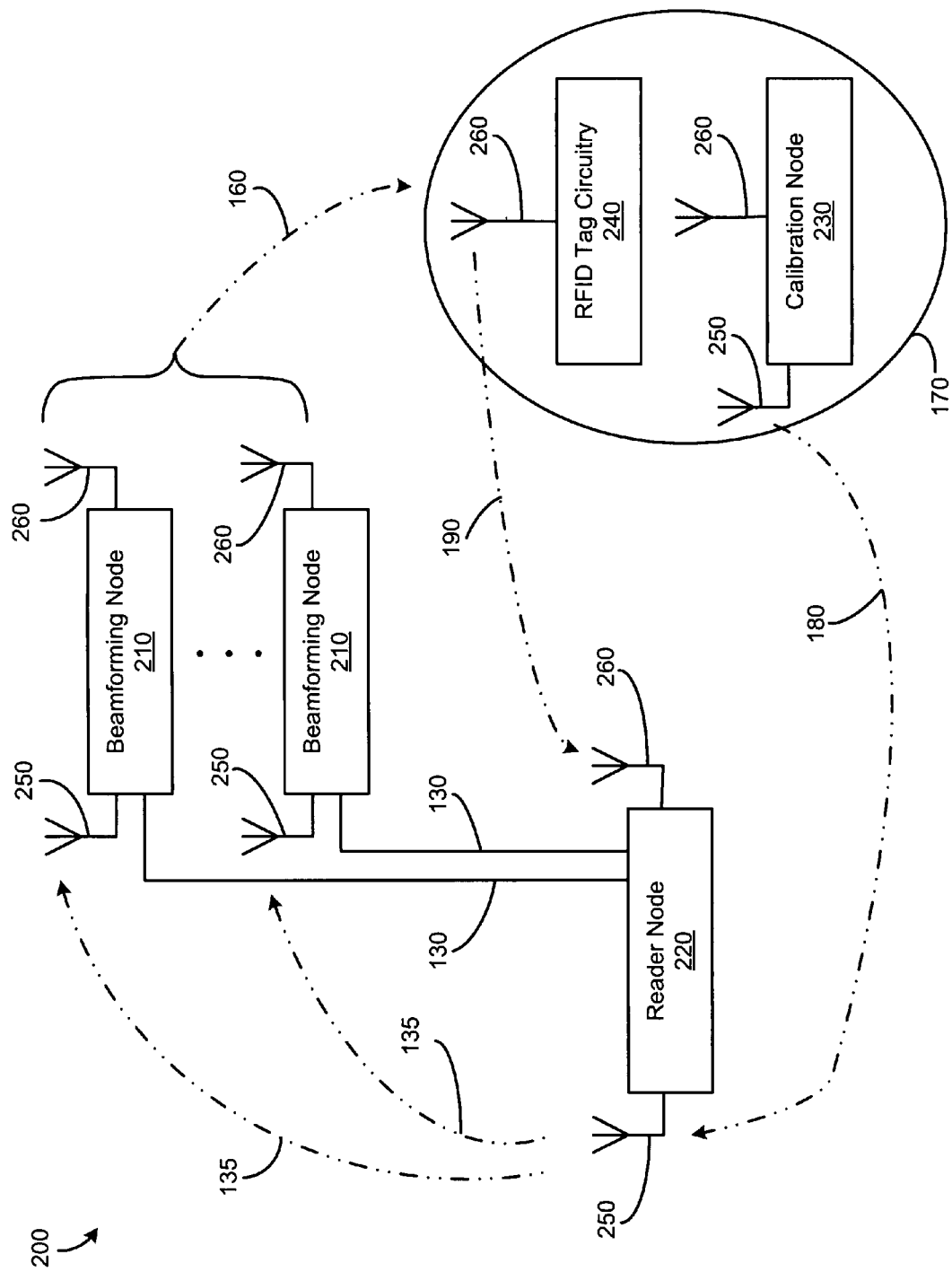
FIG. 2 is a block diagram of a beamforming system for a radio frequency identification application, according to various embodiments of the present invention.

FIG. 2 is a block diagram of a beamforming system for a radio frequency identification application. The beamforming system 200 comprises the reader node 220, a plurality of beamforming nodes 210, a plurality of beamforming control channel antennas 250, RFID channel antennas 260, beamforming control hardwired connections 130, beamforming control radio frequency connections 135, one or more calibration nodes 230, one or more RFID tags 150 located in the interrogation zone 170, the calibration data radio frequency connection 180, the radio frequency identification data 190, and the radio frequency identification signal 160. The reader node 220 may use the standard read/write protocols (e.g., governing the timing of acknowledgements, retransmissions, multiple-access arbitration) of a conventional RFID reader.

Beamforming nodes 210 are coupled to two types of radio frequency antennas, beamforming control channel antennas 250 and RFID channel antennas 260. The RFID channel antennas 260 are used by the beamforming nodes 210 to form the radio frequency identification signal 160 to energize and transmit data to the RFID tags 150 in the interrogation zone 170 using a first frequency band, such as the frequency band for standard RFID communication, herein termed the RFID band. The beamforming control channel antenna 250 communicates with the reader node 220 using a second frequency band, herein termed the control band. In some embodiments, the RFID band may be within the 900 MHz UHF radio frequency band and the control band may be within the 2.4 GHz unlicensed radio frequency band. The beamforming nodes 210 generate the radio frequency identification signals 160 with appropriate power, phase, and modulated data according to the commands and data provided to the beamforming nodes 210 by the reader node 220, through either the beamforming control hardwired connection 130 or the beamforming control radio frequency connection 135.

The beamforming control channel antennas 250 function in conjunction with each other to direct the radio frequency identification signals 160 to the interrogation zone 170. The calibration node 230 takes measurements of the radio frequency identification signals 160, such as net received power or signal-to-noise ratio, and relays feedback regarding this information back to the beamforming nodes 210, either directly or through the reader node 220 as above. A feedback control loop is employed by the beamforming nodes 210 to adapt the phases and/or transmitted power of the radio frequency identification signals 160 to maximize the power or signal-to-noise ratio received by the calibration node 230, and hence any RFID tag circuitry 240 in the interrogation zone 170.

In various embodiments, the beamforming system 200 may use any of a number of feedback control loop iterative algorithms. The feedback control loop maximizes the quality of the net received signal at the calibration node 230, which may be determined by the net received power or the signal-to-noise ratio. The feedback control loop may provide a direct estimate of the average received power at the calibration node 230, and/or an estimate of both the power and phase evolution of the received signal. Alternatively, the feedback control loop may provide an estimate of the difference in received powers corresponding to different phase settings employed by the beamforming nodes 210. The feedback control loop can be employed for adaptation of a centralized antenna array. Thus, any algorithm that is used in such a centralized setting can be employed in a distributed setting as well, as long as the beamforming weight $w_i$ for the ith array element depends only on its prior values and on the feedback. In this case, the ith beamforming node 210 becomes equivalent to the ith array element in a centralized adaptive antenna array.

One application of the algorithm described in Mudumbai et al. to the beamforming system 200 is as follows. The beamforming nodes 210 transmit at constant gain, and vary only their phases. Thus, the beamforming weight for the ith beamforming node 210 is $w_i = e^{j\Phi_i}$. The iterative algorithm then performs the following steps. First, the reader node 220 commands the beamforming nodes 210 to randomly perturb their phases by a small random number, whose distribution is symmetric around zero. For example, the perturbation may be chosen with equal probability to be +a or −a, where a is a small phase value. Alternately, the perturbation may be chosen to be uniform over the interval [−a, a]. Next, the calibration node 230 computes the received power P. This value is transmitted back to the reader node 220. In some embodiments, a single bit, denoting whether the present value of P is larger or smaller than the value at the previous iteration, may be transmitted back to the reader node 220. If the received power P is larger than the previous iteration, the phase changes made at the beamforming nodes 210 are kept; otherwise the phases from the previous iteration are kept. These steps may be repeated. Using this algorithm, the radio frequency identification signal 160 generated by the beamforming nodes 210 will converge to the optimal phase values, thus maximizing the received power at the RFID tags 150 in the interrogation zone 170.

When the received power P is reported to the reader node 220 in a feedback loop control, an iterative algorithm such as a gradient ascent algorithm may also be used to maximize the received power at the calibration node 230. For example, in the ascent algorithms such as the DRD and LRS algorithms in Widrow and McCool, the ith beamforming weight $w_i$ depends only on its past value and the feedback. These gradient ascent algorithms can therefore be employed for adaptation of the beamforming weights, even though the beamforming nodes 210 may not be co-located.

An advantage of the feedback control loop is a reduced need for careful manual alignment of the RFID channel antennas 260. In various embodiments, the beamforming nodes 210 use iterative algorithms taking as input the measured data provided by calibration nodes 230 to optimize radio frequency identification signals 160, thus maximizing the signal quality received at the calibration node 230. Alternatively, reader nodes 220 compute and provide commands to the beamforming nodes 210 to optimize the radio frequency identification signals 160, thus maximizing the signal quality received at the calibration node 230. In various embodiments, an iterative adaptive algorithm may be implemented in software, firmware, or hardware, to implement the feedback control loop.

The use of multiple antenna elements (for example multiple RFID channel antennas 260) for improvements in link power budget, diversity, and spatial multiplexing can be combined with other techniques known to those of skill in the art of antenna design and/or wireless communications, in various embodiments. For example, instead of the beamforming nodes 210 locking onto a reference frequency signal from the reader node 220, their local oscillators can operate in open loop. The frequency offset of the radio frequency identification signal 160 at each beamforming node 210 from its nominal value can be corrected using feedback from the calibration node 230. For example, the calibration node 230 can use its local oscillator as a reference to compute the estimated frequency offset for the ith instance of beamforming node 210, and feed that information back to the ith instance of beamforming node 210. This calibration can be done one at a time for each beamforming node 210. Each beamforming node 210 can then apply an appropriate frequency offset correction in transmit circuitry as will be described with reference to FIG. 5. The residual phase drift can be corrected using the feedback control algorithm. Alternatively, if the local oscillator tolerances of the beamforming node 210 are small enough, then the frequency drift can be corrected as part of the feedback control algorithm, without requiring any initial calibration when the beamforming system is set up.

Figure 3:
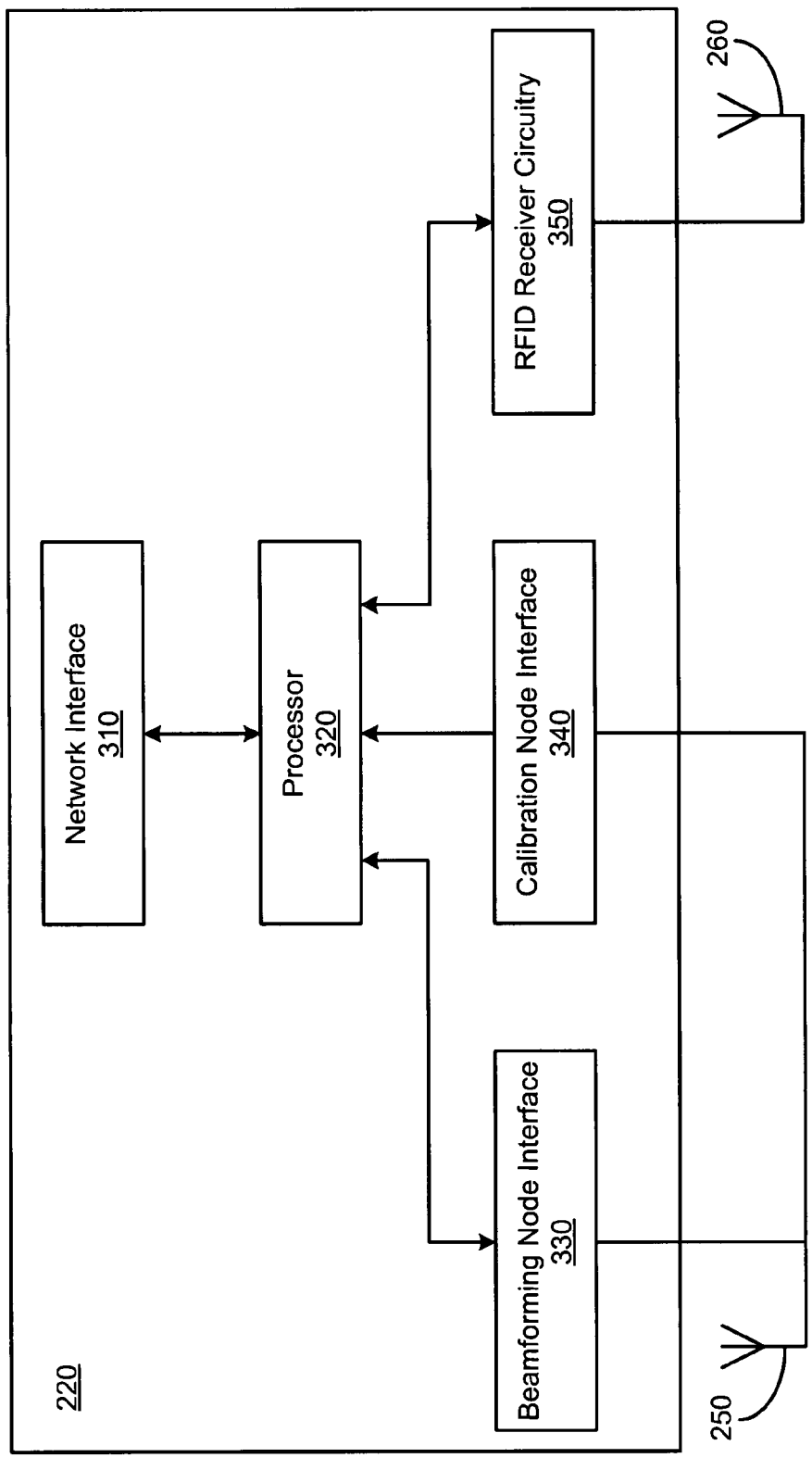
FIG. 3 is a block diagram of a reader node, according to various embodiments of the present invention.

FIG. 3 is a block diagram of a reader node 220. The reader node 220 comprises a network interface 310, a processor 320, a beamforming node interface 330, a calibration node interface 340, and RFID receiver circuitry 350. The reader node 220 couples to the beamforming control channel antenna 250 and the RFID channel antenna 260. The RFID receiver circuitry 350 receives the modulated and backscattered radio frequency identification data 190 returning from the RFID tag 150 using the RFID channel antenna 260, demodulates the data, and provides the data to the processor 320. The network interface 310 enables communication between the reader node 220 and external computing and communication devices (not shown), and may be implemented using any wired or wireless communication channel. The network interface 310 may connect with the processor 320 for communication and control between these external computing and communication devices and the beamforming system 200, and may share RFID tag data from the processor 320 with these external computing and communication devices. This RFID tag data comprises the identity, number and/or location of the RFID tags 150 within an interrogation zone 170. The processor 320 contains the standard RFID signal decoding algorithms known to those of skill in the art of RFID systems that are used to process the data received by the RFID receiver circuitry 350 through the RFID channel antenna 260.

The processor 320 connects to the beamforming nodes 210 through the beamforming node interface 330 to control the beamforming operations. The beamforming operations comprise specifying which region is to be scanned and specifying the data that is to be sent to the RFID tags 150. The beamforming node interface 330 may communicate with the beamforming nodes 210 through a beamforming control hardwired connection 130 and/or a beamforming control radio frequency connection 135 utilizing a beamforming control channel antenna 250.

The data received by the processor 320, through the calibration node interface 340, controls the algorithm used to direct the radio frequency identification signal 160 generated by the beamforming module 110 within the interrogation zone 170. The calibration node interface 340 may communicate with the calibration nodes 230 through a hardwired connection (not shown), a calibration data radio frequency connection 180 using a beamforming control channel antenna 250, or both. If the calibration node 230 communicates directly with the beamforming nodes 210 rather than with the reader node 220, as above, the reader node 220 need not contain the calibration node interface 340.

Figure 4:
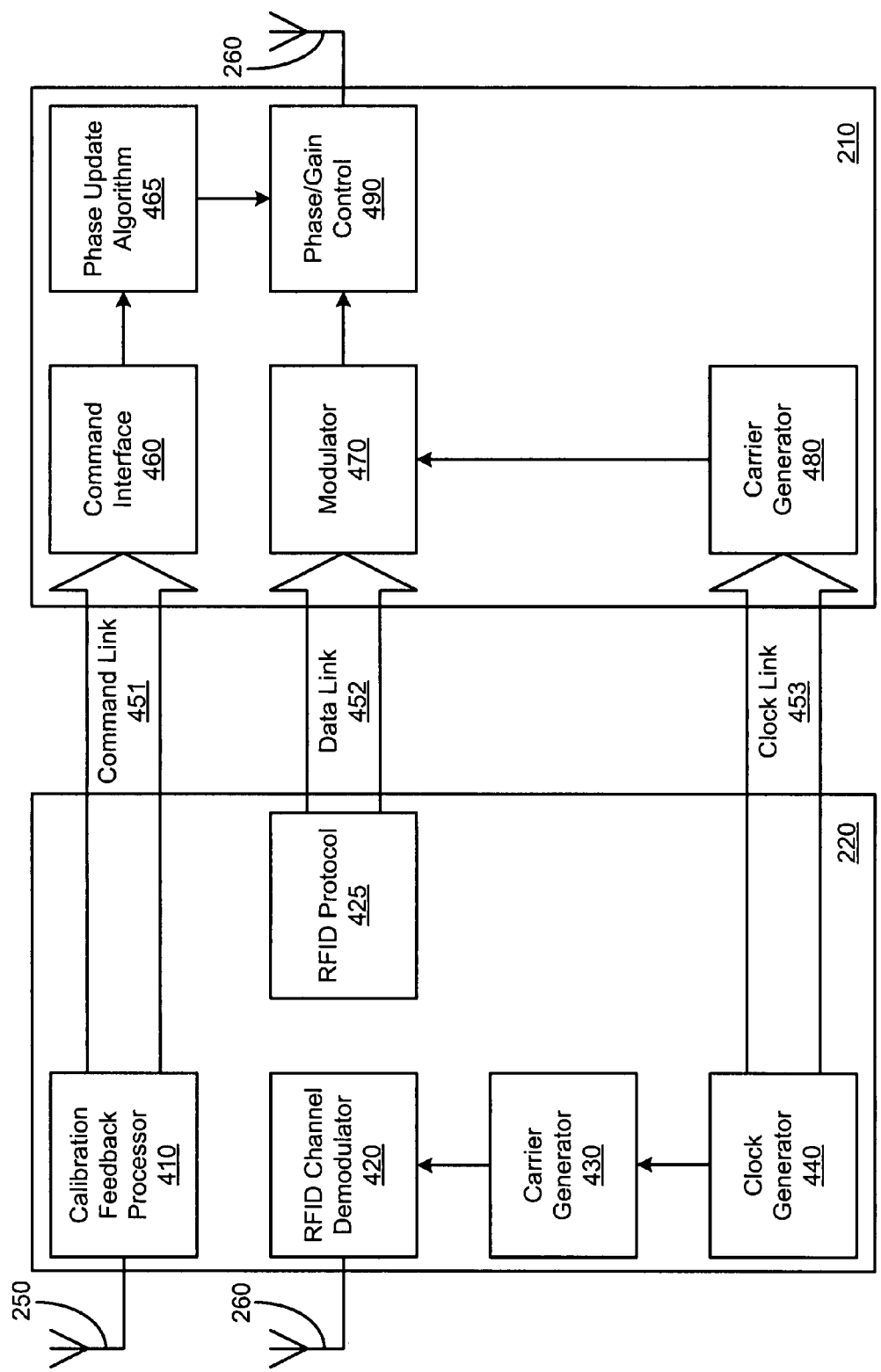
FIG. 4 is a block diagram of a beamforming control system, according to various embodiments of the present invention.

FIG. 4 is a block diagram of a beamforming control system. The beamforming control system comprises the reader node 220 and a plurality of beamforming nodes 210. The reader node 220 communicates with the beamforming nodes 210 through three logical links which may be communicated through one or more hardwired or wireless connections, as described with reference to FIG. 2. These logical links are the command link 451, the data link 452, and the clock link 453. The reader node 220 comprises a calibration feedback processor 410, an RFID channel demodulator 420, a carrier generator 430, and a clock generator 440. The beamforming node 210 comprises a command interface 460, a modulator 470, a phase/gain control 490, and a carrier generator 480. The reader node 220 couples to RFID channel antenna 260 and a beamforming control channel antenna 250. Reader node 220 uses an RFID protocol 425 to send data to modulator 470. Beamforming node 210 uses a phase update algorithm 465 to adjust the phase/gain control 490.

The reader node 220 receives feedback information from the calibration nodes 230 through the beamforming control channel antenna 250. The information is demodulated and processed by the calibration feedback processor 410, and using command link 451, is distributed to the beamforming nodes 210. In some embodiments, the calibration feedback processor 410 simply passes the data received by the calibration nodes 230 to the beamforming nodes 210 via the command link 451. In other embodiments, the calibration feedback processor 410 processes the data received from the calibration nodes 230 using an algorithm to generate specific commands for the beamforming nodes 210 to control the phase and/or gain of the radio frequency identification signal 160 transmitted using RFID channel antenna 260. The reader node 220 generates a clock signal using the clock generator 440 which is then used to generate a carrier frequency using the carrier generator 430. The reader node also distributes the clock signal from the clock generator 440 to the beamforming nodes 210 over the clock link 453. This clock signal is used by the beamforming nodes 210 to achieve frequency synchronization among all beamforming nodes 210. The carrier generator 430 is used by the RFID channel demodulator 420 to demodulate the data from the RFID tags 150 within the interrogation zone 170. The RFID protocol 425 is used by the reader node 220 to distribute RFID tag-specific data to the beamforming nodes 210 over the data link 452. This RFID tag-specific data is transmitted to the RFID tags 150 within the interrogation zone 170.

The beamforming node 210 interfaces with the reader node 220 through the command link 451, the data link 452, and the clock link 453. The clock link 453 is used by the carrier generator 480 to achieve frequency synchronization with the other beamforming nodes 210. The data link 452 contains the RFID tag-specific data to be transmitted by the beamforming nodes 210 over the RFID channel antenna 260. The RFID tag-specific data is modulated onto a carrier at the RFID link frequency in the RFID band (the first frequency band) using a modulator 470. The modulated carrier's phase and power level are set by the phase/gain control 490 and subsequently transmitted through the RFID channel antenna 260. Using command link 451, the command interface 460 receives information from the reader node 220 regarding the received radio frequency identification signal 160 at the calibration node 230. The beamforming node 210 uses this information, using the phase update algorithm 465, to control the gain and phase of the complex envelope of radio frequency identification signal 160 transmitted over RFID channel antenna 260. The gain g and phase φ together define a complex-valued beamforming weight $w=ge^{j\phi}$, where $j=\sqrt{-1}$.

Figure 5:
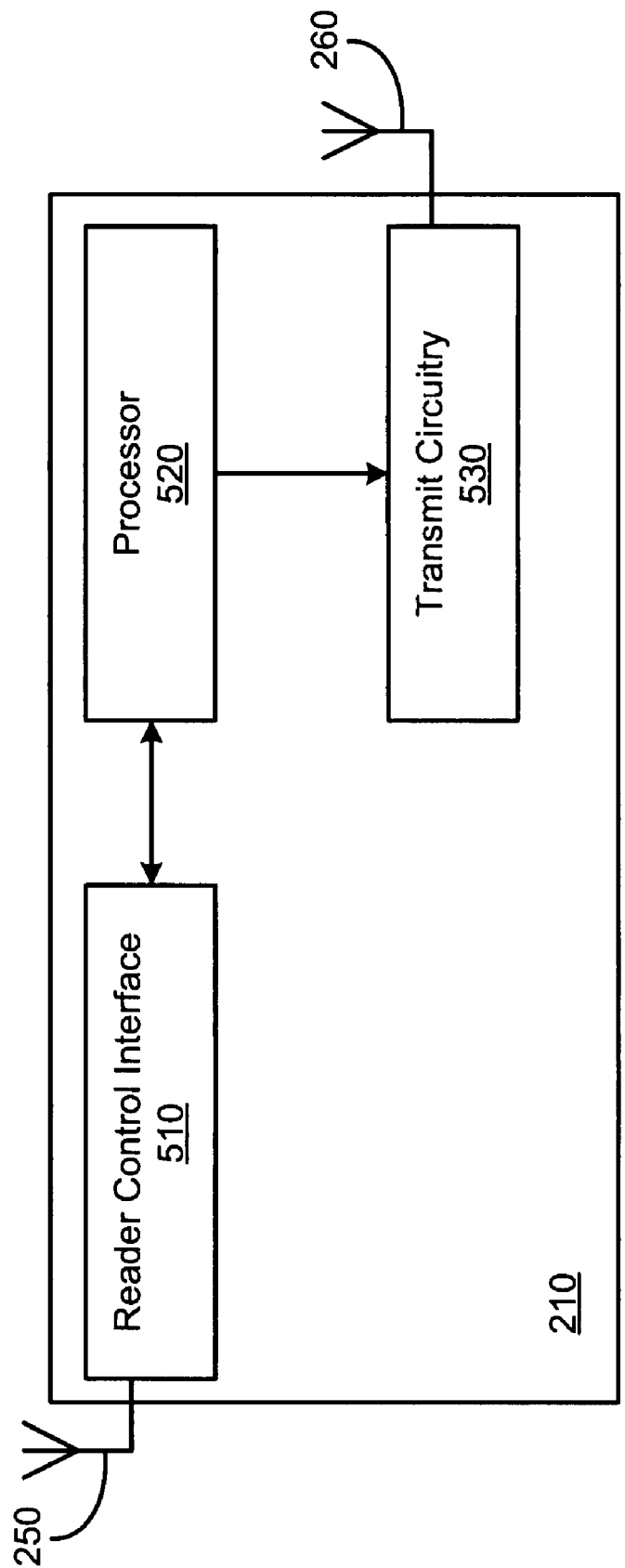
FIG. 5 is a block diagram of a beamforming node system, according to various embodiments of the present invention.

FIG. 5 is a block diagram of a beamforming node system. The beamforming node 210 comprises a reader control interface 510, a processor 520, and transmit circuitry 530. The beamforming node 210 is coupled to the beamforming control channel antenna 250. The beamforming node 210 is also coupled to an RFID channel antenna 260. The reader control interface 510 receives the data and the commands sent over the command link 451 and data link 452 from the reader node 220. As above, the beamforming node 210 may interface with the reader node 220 via a beamforming control channel antenna 250, a beamforming control hardwired connection 130, or a combination thereof. The processor 520 utilizes the data and commands provided by the reader control interface 510, along with the clock link 453 from the reader node 220, to generate the radio frequency identification signal 160 using the transmit circuitry 530 which then drives RFID channel antenna 260 to transmit the radio frequency identification signal 160.

Figure 6:
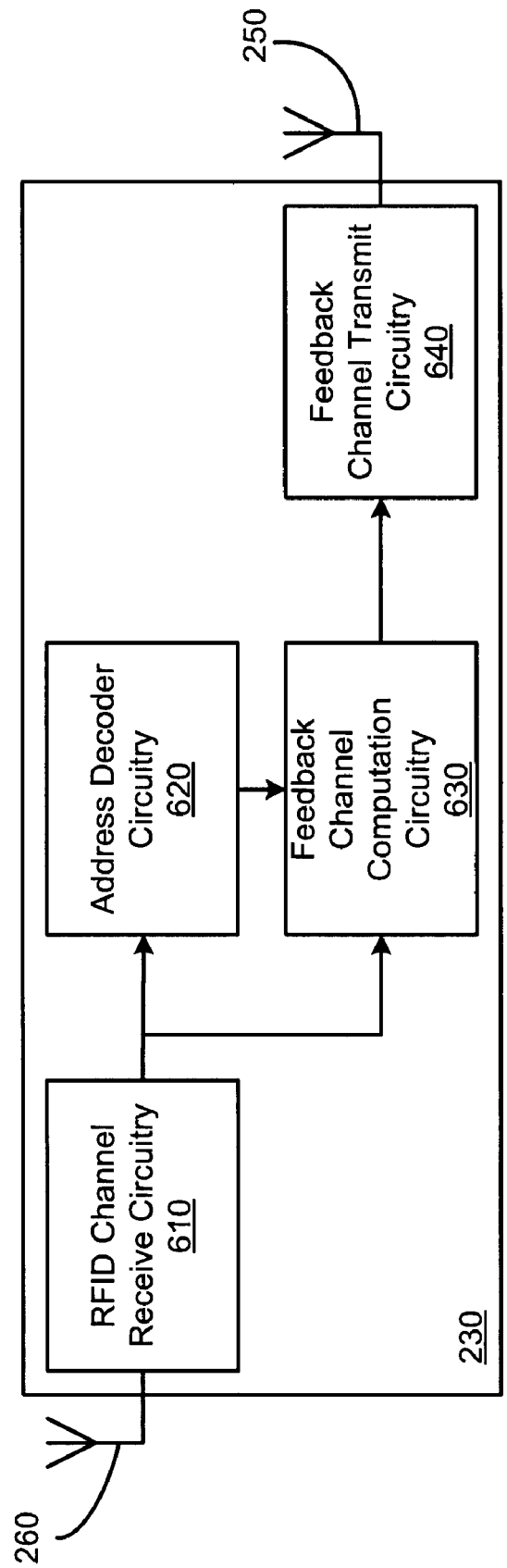
FIG. 6 is a block diagram of a calibration node system, according to various embodiments of the present invention.

FIG. 6 illustrates a block diagram of a calibration node system, according to various embodiments. The calibration node 230 comprises RFID channel receive circuitry 610, address decoder circuitry 620, feedback channel computation circuitry 630, and feedback channel transmit circuitry 640. The calibration node is coupled to an RFID channel antenna 260 and a beamforming control channel antenna 250. As above, in some embodiments, the calibration node 230 may connect directly to either the reader node 220 or the beamforming node 210 via a hardwired connection (not shown). Through RFID channel antenna 260, the calibration node 230 receives and demodulates the radio frequency identification signal 160 using RFID channel receive circuitry 610. The feedback channel computation circuitry 630 then analyzes the received signal for use in the feedback loop to control the radio frequency identification signal 160 generated by the beamforming nodes 210. The analysis depends on the specific beamforming algorithm implemented in the beamforming control system 200. The resulting data may include signal-to-noise ratio, received signal strength, and complex amplitudes. The data is quantized to the required number of bits by the feedback channel computation circuitry 630 and transmitted back to the reader node 220 using the feedback channel transmit circuitry 640.

In a typical system, one or more calibration nodes 230 may be positioned in the interrogation zone 170. The reader node 220 may select feedback information from any or all of the calibration nodes 230. In addition, the reader node 220 synchronizes the calibration nodes 230 so that they do not send data at the same time in a way that causes interference. To accomplish this, in various embodiments each calibration node 230 within the beamforming system 200 has a unique address. In these embodiments, the reader node 220 first transmits the address of the calibration node 230 that should respond. This transmission may be accomplished via the beamforming nodes 210 using the radio frequency identification signal 160. Each calibration node 230 receives this address information using the RFID channel antenna 260. After demodulation by the RFID channel receive circuitry 610, the received address is decoded and compared to the predetermined calibration node address by the address decoder circuitry 620. Each calibration node 230 only responds to the reader node 220 if the received address matches its predetermined address.

Figure 7:
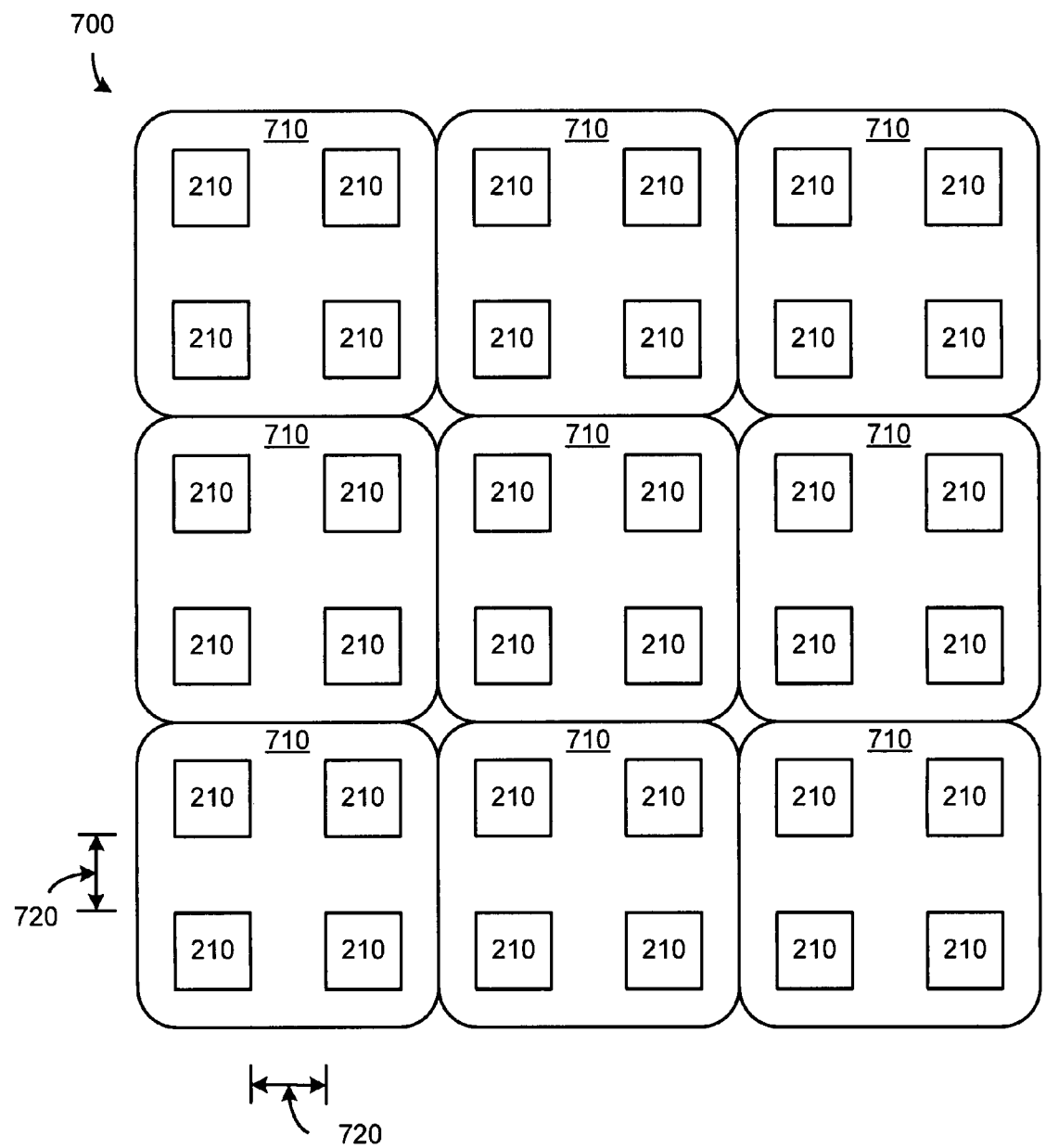
FIG. 7 illustrates a beamforming array, according to various embodiments of the present invention.

FIG. 7 illustrates a beamforming panel array, according to various embodiments. The beamforming array 700 consists of a plurality of beamforming panels 710, each of which includes a plurality of beamforming nodes 210 and their respective beamforming control channel antennas 250 and RFID channel antennas 260 (not shown). A beamforming array 700 may include any number of beamforming nodes 210 on a beamforming panel 710, and may include any number of beamforming panels 710, as long as there are at least two beamforming nodes 210 in the beamforming array 700. To improve the beamsteering capabilities for the radio frequency identification signal 160, the beamforming array 700 may be arranged such that the distance between all beamforming nodes 210 is equal to a distance 720, where distance 720 is optimally one half the wavelength of the radio frequency identification signal 160 transmitted by the beamforming array 700. In various embodiments, the beamforming array 700 may extend into one, two or three spatial dimensions.

To reduce interference and increase read range and reliability, more beamforming panels 710 may be used in the beamforming array 700 to produce a radio frequency identification signal 160 directed to a narrower region of space. In other embodiments, however, the beamforming nodes 210 may be arbitrarily arranged without a uniform distance between each of the beamforming nodes 210. The feedback control loop described herein enables automated self-calibration, which may be used to compensate for an unknown arrangement of a set of beamforming nodes 210 in a beamforming panel 710 and/or an arbitrarily arranged set of beamforming panels 710 in the beamforming array 700.

Figure 8:
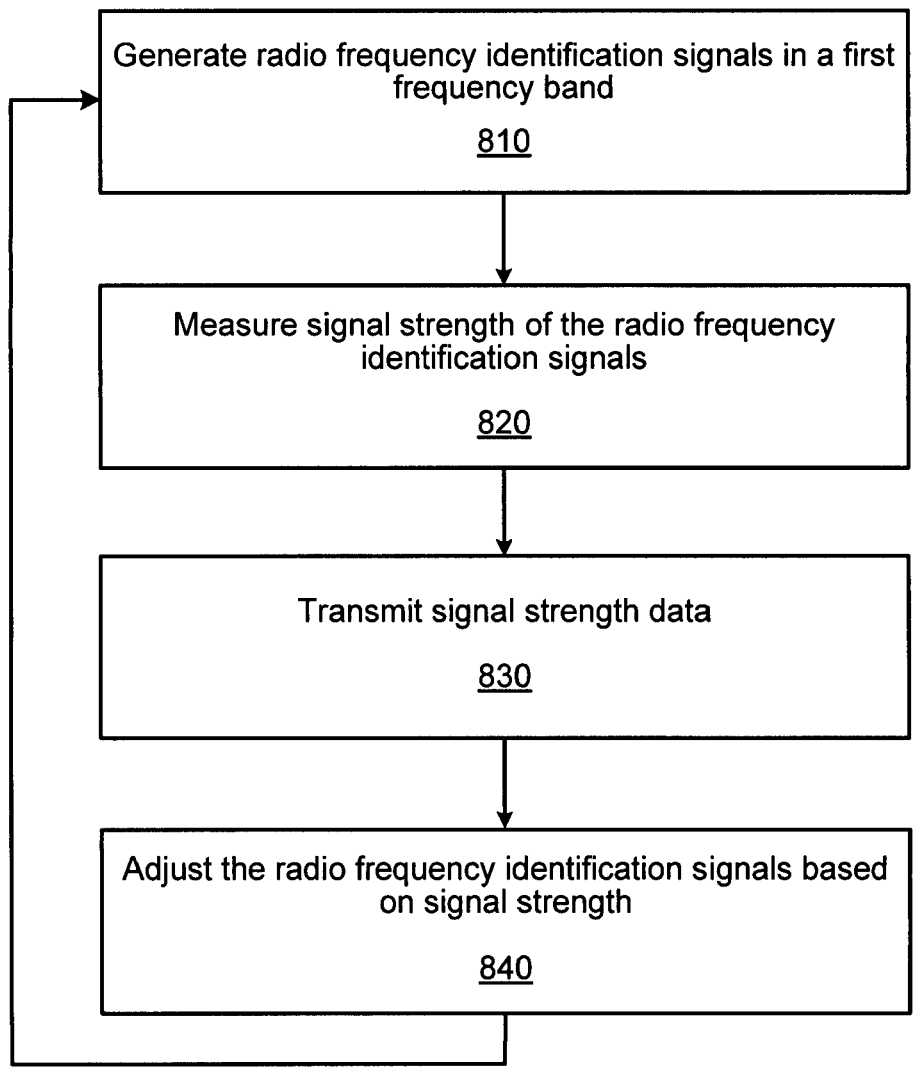
FIG. 8 illustrates methods of beamforming, according to various embodiments of the present invention.

FIG. 8 is a flowchart of a method of beamforming, according to various embodiments of the present invention. A feedback control loop is used to control a directional electromagnetic energy beam that energizes and communicates with the RFID tags 150 within the interrogation zone 170. In step 810, the radio frequency identification signal 160 is generated in a first frequency band. In step 820, the calibration node 230 takes measurements of the received radio frequency identification signal 160, such as average power and/or signal-to-noise ratio. In step 830, the calibration node 230 transmits the signal measurement data measured in step 820 to either the reader node 220 or to the beamforming nodes 210. In step 840, the phase and/or power level of the radio frequency identification signal 160, transmitted by for example the beamforming nodes 210 and/or the RFID channel antenna 260, and is adjusted based on the signal measurement data using a feedback loop. The feedback loop may use one of a variety of algorithms for beamforming as discussed above. Following step 840, the method returns to step 810 and may repeat.

Figure 9:
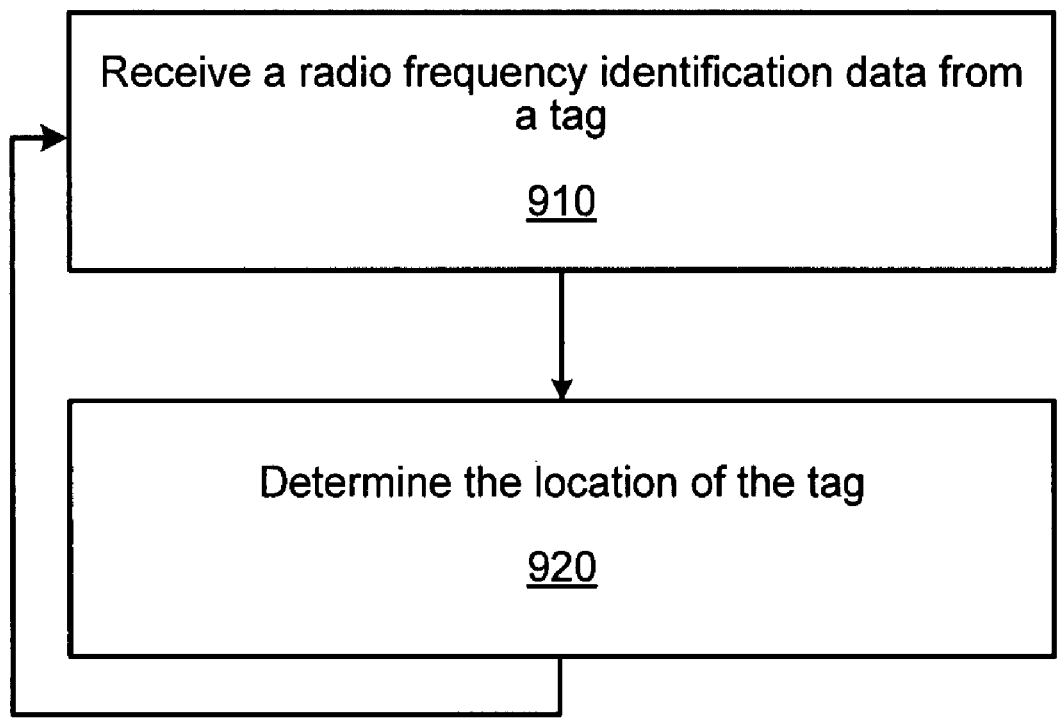
FIG. 9 illustrates methods of reading data from RFID tags, according to various embodiments of the present invention.

FIG. 9 is a flowchart of a method of reading data from RFID tags, according to various embodiments of the present invention. In this method, data from the RFID tag circuitry 240 is read by the reader node 220, which then determines the location of specific RFID tags 150 based on, for example, the beamsteering features of a beamforming array 700. In step 910, the reader node 220 receives data transmitted by the RFID tag circuitry 240 via the modulated and backscattered radio frequency identification data 190. In step 920, the reader node uses information received from the RFID tag circuitry 240, including for example an identification number, along with the data from the calibration node 230 and data from the beamforming control algorithm to determine the physical location of RFID tag circuitry 240, and consequently the item tagged by RFID tag circuitry 240. In various embodiments, the location of an RFID tag 150 may be determined using the signal strength of the radio frequency identification data 190 as a function of the radio frequency identification signal 160 received by an RFID tag 150 and the one or more calibration nodes 230.

Figure 10:
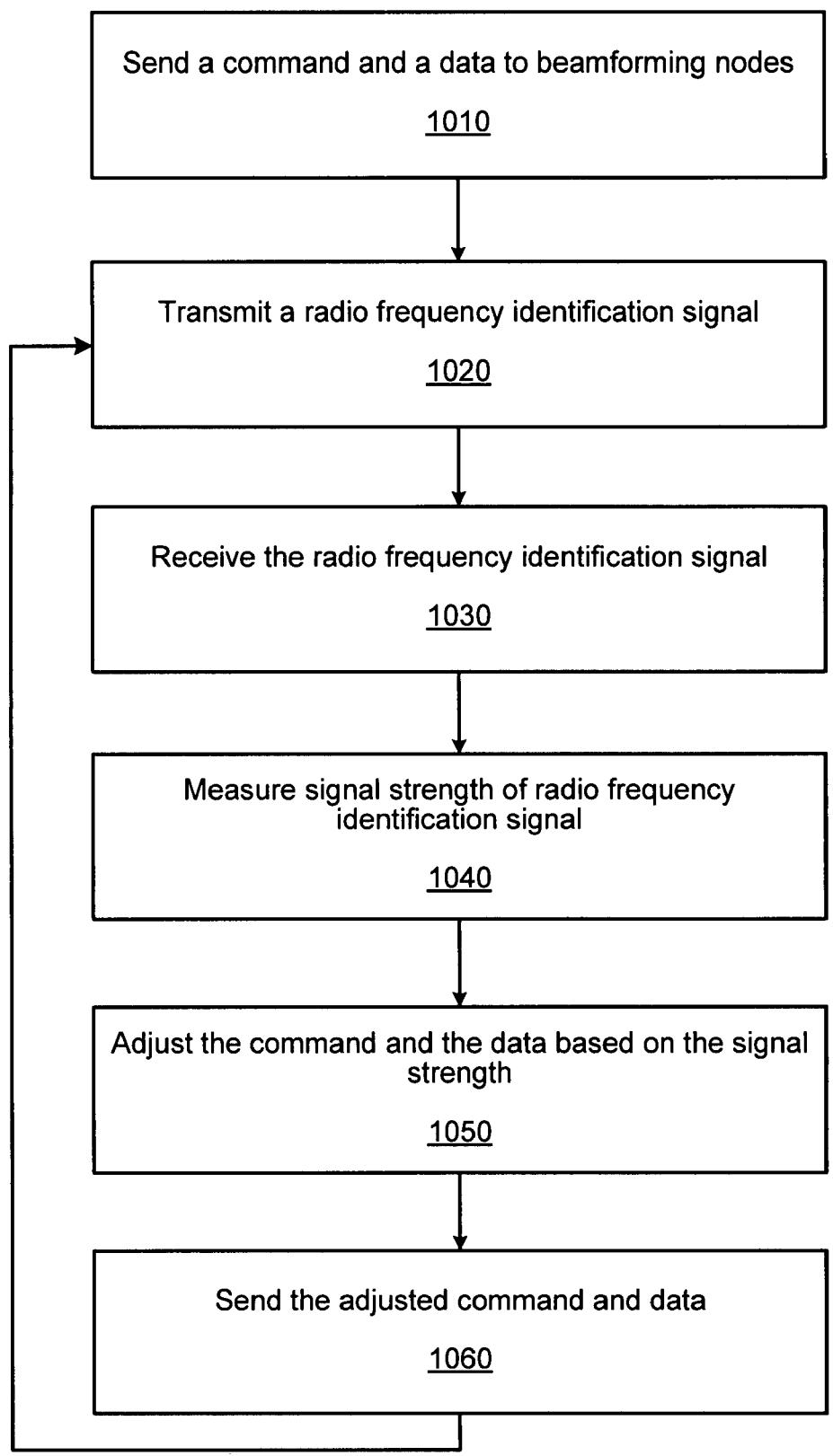
FIG. 10 illustrates methods of beamforming, according to various embodiments of the present invention.

FIG. 10 illustrates the methods of beamforming, according to various embodiments of the present invention. In these methods, a feedback control loop is utilized to control a directional electromagnetic energy beam that energizes and communicates with the RFID tags 150 within the interrogation zone 170. In step 1010, the reader node 220 sends a command and data to the beamforming nodes 210 to control the generation of the radio frequency identification signal 160. In step 1020, the beamforming nodes 210 transmit a radio frequency identification signal 160 directed toward the interrogation zone 170. In step 1030, the calibration nodes 230 receive the radio frequency identification signal 160 transmitted by the beamforming nodes 210. In step 1040, the calibration node 230 transmits a signal strength data, based on measurements of the radio frequency identification signal 160, to the reader node 220. In step 1050, the reader node 220 adjusts the command and data to be sent to the beamforming nodes 210 based on the signal strength data. In step 1060, the reader node 220 sends the adjusted command and data to the plurality of beamforming nodes 210. Following step 1060, the method returns to step 1020 and may repeat.

While various embodiments have been described herein, it should be understood that they have been presented by way of example only, and not limitation. For example, any of the elements associated with the beamforming system 200 may employ any of the desired functionality set forth herein. Thus, the breadth and scope of any particular embodiment should not be limited by any of the herein-described exemplary embodiments.

What is claimed is:

1. A system for radio frequency identification of a tag in an interrogation zone comprising:
 a plurality of beamforming nodes each configured to generate radio frequency identification signals in a first frequency band;
 a calibration node disposed in the interrogation zone configured to measure a signal strength of the radio frequency identification data; and
 a reader node configured to receive the signal strength data and to adjust the radio frequency identification signals generated by the beamforming nodes based upon the signal strength data.

2. The system of claim 1 wherein the calibration node, the reader node, and the plurality of beamforming nodes are coupled in a feedback control loop.

3. The system of claim 1 wherein the calibration node is further configured to transmit the signal strength data in a second frequency band.

4. The system of claim 1 wherein the calibration node is further configured to transmit the signal strength data using a hardwired connection.

5. The system of claim 1 wherein the reader node is further configured to receive radio frequency identification data from the tag in the first frequency band.

6. The system of claim 1 wherein the calibration node is further configured to receive radio frequency identification data from the tag in the first frequency band.

7. The system of claim 6 wherein the calibration node is further configured to transmit radio frequency identification data to the reader node.

8. The system of claim 1 wherein the reader node is coupled to the plurality of beamforming nodes using a second frequency band.

9. The system of claim 1 wherein the reader node is coupled to the plurality of beamforming nodes using a hardwired connection.

10. The system of claim 1 wherein the plurality of beamforming nodes are further configured to receive the signal strength data.

11. The system of claim 1 wherein each of the plurality of beamforming nodes are separated from the calibration node by one meter or more.

12. The system of claim 1 wherein the reader node is separated from the calibration node by one meter or more.

13. The system of claim 1 wherein the plurality of beamforming nodes form a one-dimensional beamforming array.

14. The system of claim 1 wherein the plurality of beamforming nodes form a two-dimensional beamforming array.

15. A method comprising:
 generating radio frequency identification signals in a first frequency band with a plurality of beamforming nodes;
 measuring the signal strength of the radio frequency identification signals in an interrogation zone with a calibration node disposed in the interrogation zone;
 transmitting a signal strength data in a second frequency band with the calibration node; and
 adjusting the radio frequency identification signals at a reader node based on the signal strength.

16. The method of claim 15 further comprising:
 receiving radio frequency identification data in the first frequency band from a tag; and
 determining the location of the tag.

17. The method of claim 15 wherein adjusting the radio frequency identification signals uses an iterative algorithm.

18. The method of claim 15 further comprising receiving a radio frequency identification data from a tag.

19. The method of claim 15 further comprising coupling the reader node to the plurality of beamforming nodes using a wireless connection in a second frequency band.

20. The method of claim 15 further comprising coupling the reader node to the plurality of beamforming nodes using a hardwired connection.

21. The method of claim 15 further comprising coupling the calibration node to the reader node using a hardwired connection.

22. The method of claim 15 further comprising receiving the signal strength data using the plurality of beamforming nodes.

23. A method comprising:
 sending a command and data to a plurality of beamforming nodes;
 transmitting a radio frequency identification signal using the plurality of beamforming nodes;
 receiving the radio frequency identification signal;
 measuring the signal strength of the radio frequency identification signal in an interrogation zone;
 adjusting the command and the data based on the signal strength; and
 sending the adjusted command and the adjusted data to the plurality of beamforming nodes.

24. The method of claim 23 further comprising:
receiving a radio frequency identification data from a tag; and
determining the location of the tag.

25. The method of claim 24 further comprising using an iterative algorithm to determine the location of the tag.

* * * * *